United States Patent [19]

Burns et al.

[11] Patent Number: 4,560,410

[45] Date of Patent: Dec. 24, 1985

[54] FOUNTAIN SOLUTIONS SUITABLE FOR USE IN LITHOGRAPHIC OFFSET PRINTING

[75] Inventors: Richard J. Burns, Piscataway; Friso G. Willeboordse, Warren Township, Union County, both of N.J.; Martin F. Cohen, Yorktown Heights, N.Y.

[73] Assignee: Union Carbide Corporation, Danbury, Conn.

[21] Appl. No.: 503,649

[22] Filed: Jun. 16, 1983

Related U.S. Application Data

[63] Continuation of Ser. No. 264,076, May 18, 1981, abandoned.

[51] Int. Cl.[4] .................................................. C09K 3/18

[52] U.S. Cl. .......................................... 106/2; 101/451

[58] Field of Search ................. 106/2; 252/174.22, 70; 101/451

[56] References Cited

U.S. PATENT DOCUMENTS

| | | | |
|---|---|---|---|
| 3,877,372 | 4/1975 | Leeds | 101/465 |
| 4,213,873 | 7/1980 | Church | 106/13 |
| 4,278,467 | 7/1981 | Fadner | 106/2 |
| 4,279,073 | 7/1981 | Packer | 106/2 |

*Primary Examiner*—Lorenzo B. Hayes
*Attorney, Agent, or Firm*—Jean B. Mauro

[57] ABSTRACT

Described herein is an improved fountain solution suitable for use in a lithographic offset printing press which solution contains a mixture of a polyol and/or glycol ether partially soluble in water and a polyol and/or glycol ether completely soluble in water.

8 Claims, No Drawings

FOUNTAIN SOLUTIONS SUITABLE FOR USE IN LITHOGRAPHIC OFFSET PRINTING

This is a continuation of application Ser. No. 264,076 filed May 18, 1981 now abandoned.

This invention is directed to an improved fountain solution suitable for use in a lithographic offset printing press, which solution contains a mixture of a polyol and/or glycol ether partially soluble in water and a polyol and/or glycol ether completely soluble in water.

Lithographic printing operations require the use of a dampening or fountain solution to achieve proper operation of the press so that good quality prints are obtained.

The fountain solution is generally a blend or mixture of water, acids, salts, solvents, and naturally occurring polymeric materials, such as gum arabic, and/or a variety of synthetic polymers. The purpose of the fountain solution is to wet the non-image areas of a printing plate and thus prevent ink from depositing in the non-image areas. Should the ink deposit in the non-image area, a poor quality print results. Traditionally, alcohols, especially isopropanol, were used in fountain solutions up to 30 percent volume concentration levels to achieve best performance in operation of the press with attendant high quality prints. The basis for using isopropyl alcohol resides partly in its ability to transport the fountain solution to the printing plate by means of the inked rollers in the press or through its own roller train. This property has been attributed to the low surface tension of the aqueous solution containing the isopropyl alcohol. This allows the fountain solution to wet and mix with the ink in the Dahlgren system or to keep ink and fountain solution separate as in lithographic presses with conventional dispersing systems. However, when the fountain solution is transported by the rollers in the form of a thin film, volatile components, especially the alcohol, are lost. Aside from the cost considerations in losing the alcohol by evaporation, safety considerations urge against its use. Thus, it is desirable to find a substitute for the volatile alcohol which does not have the problems associated with using isopropyl alcohol.

U.S. Pat. No. 3,877,372 described an attempt to eliminate isopropanol from the fountain solution and use a mixture of butyl cellosolve, a silicone glycol copolymer, and a defoamer.

A commercially available fountain solution utilizes 2-ethyl-1,3-hexanediol as a replacement for isopropyl alcohol to provide an isopropyl alcohol free fountain solution. The use of 2-ethyl-1,3-hexanediol eliminates the toxic and flammable properties associated with isopropyl alcohol containing fountain solutions. Also, fountain solutions containing the 2-ethyl-1,3-hexanediol provide a high quality printed product on a lithographic press.

However, it has been found that in using the 2-ethyl-1,3-hexanediol containing fountain solutions, the appearance of tinting and/or banding in the print is observed in many instances. Tinting is the deposition of minute ink droplets in the non-image area of the print resulting in the appearance of a light tint. Banding is the appearance of narrow dark streaks in the print. Thus, there is a desire to develop a non-isopropyl alcohol containing fountain solution whose use would substantially eliminate the appearance of tinting and/or banding in a print.

DESCRIPTION OF THE INVENTION

It has now been found that when a mixture of a polyol and/or glycol ether partially soluble in water and a polyol and/or glycol ether completely soluble in water is used in a fountain solution, tinting and/or banding in the resulting print is substantially reduced and in many instances eliminated.

The use of such a mixture as a replacement for isopropyl alcohol eliminates the toxic and flammable properties of conventional isopropyl alcohol-containing fountain solutions and provides a fountain solution that has the other desirable properties which provide a high quality printed product on a lithographic plate.

The fountain solution contains between about 0.5 and about 10 percent by volume of the mixture.

The mixture of polyols and/or glycol ethers which is suitable for use in this invention include a polyol and/or glycol which is partially soluble in water, such as 2-ethyl-1,3-hexanediol, Esterdiol-204, i.e., $HOCH_2C(CH_3)_2CH_2OCOC(CH_3)_2CH_2OH$, Hexyl Cellosolve, i.e., $C_6H_{13}OCH_2CH_2OH$, Hexyl Carbitol, i.e., $C_6H_{13}O(C_2H_4O)_2H$, and the like. The polyol and/or glycol ethers which is completely soluble in water includes, for example, propylene glycol, ethylene glycol, dipropylene glycol, diethylene glycol, hexylene glycol, triethylene glycol, tetraethylene glycol, tripropylene glycol, 1,5-pentanediol, methyl cellosolve, i.e., $CH_3OC_2H_4OH$, cellosolve solvent, i.e., $C_2H_5OC_2H_4OH$, butyl cellosolve solvent, i.e., $C_4H_9OC_2H_4OH$, and the like.

The solubility is measured by determining the percent by weight of the polyol and/or glycol ether which is soluble in water at 20° C. A polyol and/or glycol is characterized as partially soluble in water if its solubility in water at 20° C. is from about 0.99 to about 28.0 weight percent.

From about 0.08 to about 10 parts by volume of the polyol and/or glycol ether, which is partially soluble in water, is used per part by volume of the polyol and/or glycol ether which is completely soluble in water.

The fountain solution generally contains several other ingredients. These include water-soluble polymers, in particular water-soluble gums which contain carboxyl and hydroxyl groups. Gum arabic is the oldest and most widely used polymer. Carboxymethyl cellulose, hydroxyethyl cellulose as well as styrenemaleic anhydride copolymers, polyvinyl pyrrolidone, and the like, may also be used. These polymers are generally used in concentrations of from about 1 and about 10 percent by weight.

The fountain solutions are preferably used as aqueous acidic solutions. Phosphoric acid is a preferred acid for use in acidifying the formulation. Other acids which can be used include inorganic as well as organic acids, such as acetic acid, nitric acid, hydrochloric acid, and the like. A buffering agent, such as ammonium acetate can also be included.

The fountain solution is generally maintained at a pH of from about 2 to about 5. However, the particular pH at which a given solution will be maintained will depend upon factors, such as the type of water-soluble polymer used, other ingredients in the solution as well as the type of substrate employed in the lithographic printing plate, and the like.

Other additives which may be used in the fountain solution include preservatives such as phenol, sodium salicylate, and the like; corrosion inhibitors such as ammonium bichromate, magnesium nitrate, zinc nitrate, and the like; hardeners, such as chromium aluminum, and the like; organic solvents, such as cyclic ethers, e.g., 4-butyrolactone, and the like; low molecular weight aldehydes, such as formaldehyde, glutaraldehyde, and the like. These additives are generally used in amounts of from about 0.1 to about 10 percent by volume.

EXAMPLES

The following examples serve to illustrate specific embodiments of this invention and it is not intended that the invention shall be limited by the examples.

Control

The following ingredients were mixed together to form a fountain solution base:

0.5 ounce: gum arabic
0.5 ounce: phosphoric acid (a 5% solution in water), and
127.0 ounce: water To the formulation, which equaled one gallon (128 ounces) was added 1.3 ounces of 2-ethyl-1,3-hexanediol to make a 1 volume percent concentration of 2-ethyl-1,3-hexanediol.

The fountain solution was used on a 25 inch production size press with a Dahlgren recirculating dampening system. The press was run with the damper set at speeds of 40, 50 and 60 running approximately 200 sheets of paper at each setting. The optical density of sheets was measured at each setting. These optical density measurements were made with an Optical Densitometer. Also, a scum cycle test was performed. In this test the fountain solution feed was momentarily stopped to allow the plate to become completely coated with ink. Then the fountain solution feed was started and the number of revolutions of the plate before it was cleaned of excess ink was recorded. Further, visual observations were made of the print to determine the appearance of tinting and banding.

The results are shown in Table I.

EXAMPLE 1

The following ingredients were mixed together to form a fountain solution:

0.5 ounce: gum arabic
0.5 ounce: phosphoric acid (a 5% solution in water)
127.0 ounce: water
1.3 ounce: 2-ethyl-1,3-hexanediol, and
6.8 ounce: propylene glycol The formulation yielded a 1 volume percent concentration of 2-ethyl-1,3-hexanediol and a 5 volume percent concentration of propylene glycol.

The solution was tested as described in Control A.

The results are shown in Table I.

EXAMPLE 2

The following ingredients were mixed together to form a fountain solution:

0.5 ounce: gum arabic,
0.5 ounce: phosphoric acid (a 5% solution in water),
127.0 ounce: water,
1.3 ounce: 2-ethyl-1,3-hexanediol, and
6.8 ounce: dipropylene glycol The solution was tested as described in Control A.

The results are shown in Table I.

EXAMPLE 3

The following ingredients were mixed together to form a fountain solution:

0.5 ounce: gum arabic,
0.5 ounce: phosphoric acid (a 5% solution in water),
127.0 ounce: water,
1.3 ounce: 2-ethyl-1,3-hexanediol, and
6.8 ounce: diethylene glycol The solution was tested as described in Control A.

The results are shown in Table I.

EXAMPLE 4

The following ingredients were mixed together to form a fountain solution:

0.5 ounce: gum arabic,
0.5 ounce: phosphoric acid (a 5% solution in water),
127.0 ounce: water,
1.3 ounce: 2-ethyl-1,3-hexanediol, and
6.8 ounce: hexylene glycol The solution was tested as described in Control A.

The results are shown in Table I

TABLE I

| Example | Optical Density (°) at the speed setting of the damper | | | Scum cycle test (no. of cycles) | Observation of tinting and banding |
|---|---|---|---|---|---|
| | 40 | 50 | 60 | | |
| Control | 1.42 | 1.40 | 1.38 | 10 | Moderate tinting and banding |
| 1 | 1.19 | 1.66 | 1.31 | 8 | Very slight banding |
| 2 | 1.51 | 1.50 | 1.43 | 9 | Heavy banding |
| 3 | 1.56 | 1.54 | 1.51 | 7 | Very slight tinting |
| 4 | 1.54 | 1.54 | 1.44 | 12 | Slight tinting; heavy banding |

The data in Table I show that generally higher optical density values are obtained when 2-ethyl-1,3-hexanediol is mixed with a glycol. Also, the scum cycle values are generally lower when 2-ethyl-1,3-hexanediol is mixed with a glycol, which means that the addition of the glycol improves the cleansing operation. Further, addition of glycol to 2-ethyl-1,3-hexanediol tends to reduce tinting and banding.

EXAMPLES 5 TO 9

In these Examples fountain solutions were prepared using 2-ethyl-1,3-hexanediol and propylene glycol where the concentration of propylene glycol was varied.

EXAMPLE 5

The following ingredients were mixed together to form a fountain solution:

0.5 ounce: gum arabic,
0.5 ounce: phosphoric acid (a 5% solution in water),
127.0 ounce: water,
1.3 ounce: 2-ethyl-1,3-hexanediol, and
2.6 ounce: propylene glycol The formulation yielded a 2 volume percent concentration of propylene glycol.

The formulations were used on the press described in Control A. These different inks were used: offset ink No. 205; heatset web offset ink No. 204; and an acrylic modified sheet offset ink similar to No. 205 (National Association Printing Ink Manufacturers, August, 1974). The optical density was measured. Also, the scum cycle test was performed.

The results are shown in Table II.

EXAMPLE 6

Example 5 was exactly repeated except that 5.2 ounces of propylene glycol were used. The formulation yielded a 4 volume percent concentration of the glycol.

The results are shown in Table II.

EXAMPLE 7

Example 5 was exactly repeated except that 7.8 ounces of propylene glycol were used. The formulation yielded a 6 volume percent concentration of the glycol.

The results are shown in Table II.

EXAMPLE 8

Example 5 was exactly repeated except that 10.4 ounces of propylene glycol were used. The formulation yielded an 8 volume concentration of the glycol.

The results are shown in Table II.

EXAMPLE 9

Example 5 was exactly repeated except that 13.0 ounces of propylene glycol were used. The formulation yielded a 10 volume concentration of the glycol.

The results are shown in Table II.

2,2-dimethyl propyl 3-hydroxy-2,2-dimethylpropionate, 2-hexoxyethanol or 2-hexoxyethoxyethanol.

3. A fountain solution as defined in claims 1 or 2 wherein the polyol and/or glycol ether which is completely soluble in water is selected from one or more of propylene glycol, ethylene glycol, dipropylene glycol, diethylene glycol, hexylene glycol, triethylene glycol, tetraethylene glycol, tripropylene glycol and 1,5-pentanediol.

4. A fountain solution as defined in claim 3 wherein the polyol and/or glycol ether which is completely soluble in water is selected from one or more of propylene glycol, dipropylene glycol, diethylene glycol and hexylene glycol.

5. A fountain solution as defined in claim 1 containing from about 0.08 to about 10 parts by volume of the polyol and/or glycol ether which is partially soluble in water per part by volume of the polyol and/or glycol ether which is completely soluble in water.

6. A fountain solution as defined in claim 5 containing from about 0.1 to about 0.25 parts by volume of the polyol and/or glycol ether which is partially soluble in water per part by volume of the polyol and/or glycol ether which is completely soluble in water.

TABLE II

| Example | Ink | Propylene Glycol Volume % of total formulation | Optical density (°) | Scum cycle test (no. of cycles) | Observation of tinting and banding |
|---|---|---|---|---|---|
| 5 | Sheet fed | 2 | 1.60 | 14 | Severe tinting |
| 6 | " | 4 | 1.60 | 8 | Slight tinting |
| 7 | " | 6 | 1.50 | 6 | " |
| 8 | " | 8 | 1.60 | 5 | " |
| 5 | Web heat set | 2 | 1.40 | 20 | Severe tinting |
| 6 | " | 4 | 1.45 | 6 | Moderate tinting |
| 7 | " | 6 | 1.40 | 6 | " |
| 8 | " | 8 | 1.35 | 5 | Slight tinting |
| 9 | " | 10 | 1.50 | 6 | " |
| 5 | Acrylic modified | 2 | 1.50 | 5 | Slight tinting |
| 6 | Sheet fed | 4 | 1.60 | 7 | Slight tinting |
| 7 | " | 6 | 1.62 | 8 | " |
| 8 | " | 8 | 1.60 | 3 | " |

What is claimed is:

1. An improved fountain solution suitable for use in a lithographic offset printing press which solution contains between 0.5 and about 10% by volume of a mixture of a polyol and/or glycol ether partially soluble in water, partial solubility characterized as having a solubility in water at 20° C. of between about 0.99 to about 28 weight percent, and a polyol and/or glycol ether completely soluble in water.

2. A fountain solution as defined in claim 1 wherein the polyol and/or glycol ether which is partially soluble in water comprises 2-ethyl-1,3-hexanediol, 3-hydroxy-

7. A fountain solution as defined in claim 6 containing about 0.2 part by volume of the polyol and/or glycol ether which is partially soluble in water per part by volume of the polyol and/or glycol ether which is completely soluble in water.

8. A fountain solution as defined in claim 4 containing about 0.2 part by volume of the polyol and/or glycol ether which is partially soluble in water per part by volume of the polyol and/or glycol ether which is completely soluble in water.

* * * * *